Figure 1:
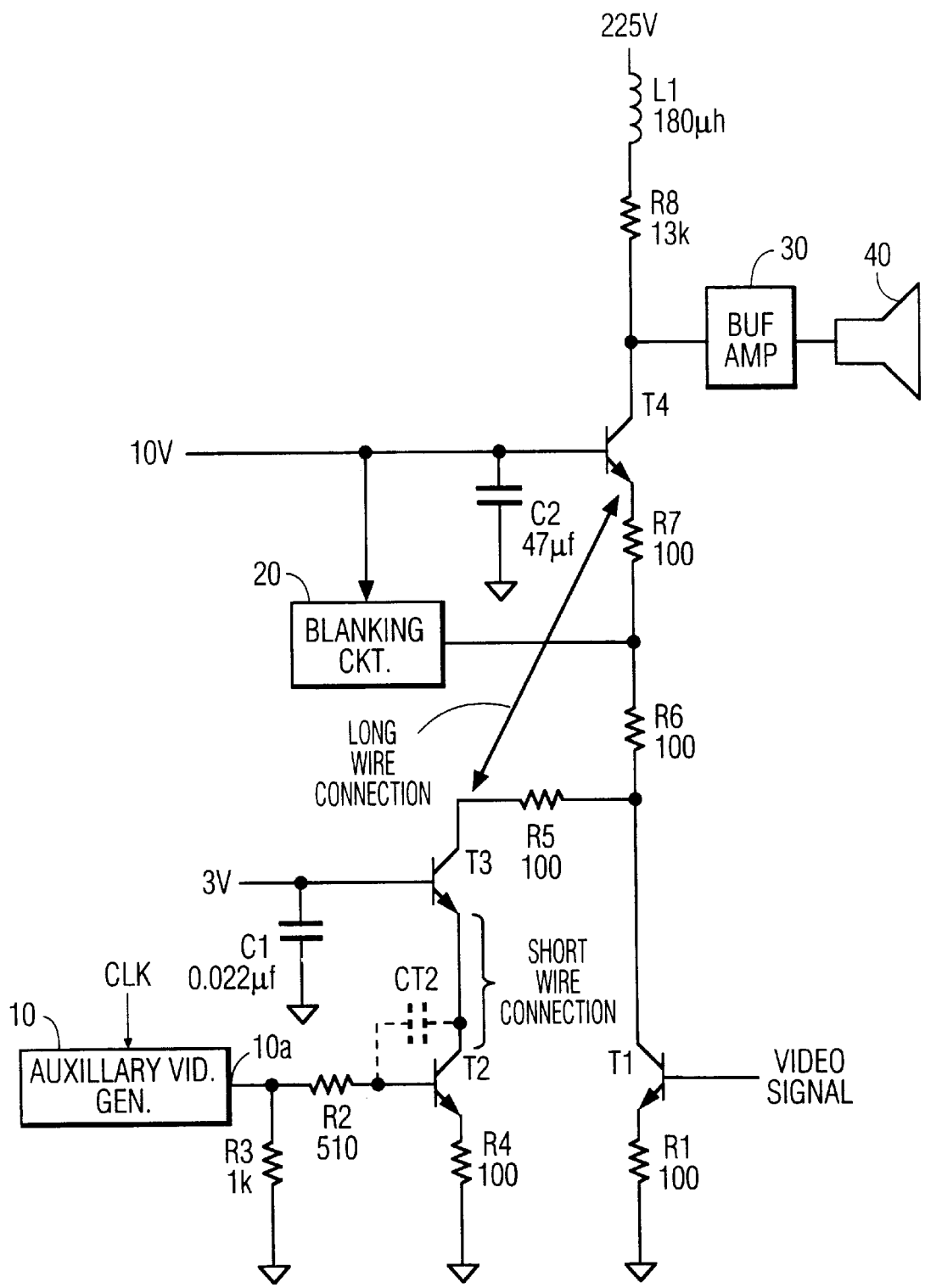

United States Patent [19]
George

[11] Patent Number: 5,969,762
[45] Date of Patent: Oct. 19, 1999

[54] VIDEO SIGNAL DRIVER INCLUDING A CASCODE TRANSISTOR

[75] Inventor: John Barrett George, Carmel, Ind.

[73] Assignee: Thomson Consumer Electronics, Inc., Indianapolis, Ind.

[21] Appl. No.: 08/807,842

[22] Filed: Feb. 26, 1997

[51] Int. Cl.[6] .................................................. H04N 9/20
[52] U.S. Cl. ..................... 348/379; 348/173; 348/689; 348/691; 315/386; 315/381; 315/384
[58] Field of Search ..................... 348/707, 805

[56] References Cited

U.S. PATENT DOCUMENTS

| | | | |
|---|---|---|---|
| 4,270,126 | 5/1981 | Bafaro ........................................ | 345/12 |
| 4,276,566 | 6/1981 | Parker ....................................... | 348/690 |
| 4,547,799 | 10/1985 | Rodgers, III ............................. | 348/379 |
| 4,598,316 | 7/1986 | Rogers, III ............................... | 348/689 |
| 4,689,679 | 8/1987 | Hinn ......................................... | 348/689 |
| 4,698,681 | 10/1987 | Kadlec et al. ............................ | 358/168 |
| 4,727,336 | 2/1988 | Mark ........................................ | 330/367 |
| 4,763,046 | 8/1988 | Sheikholeslami ....................... | 315/381 |
| 4,803,464 | 2/1989 | Holmes et al. .......................... | 340/732 |
| 4,860,107 | 8/1989 | Furrey ...................................... | 358/184 |
| 5,034,665 | 7/1991 | Wignot et al. ........................... | 315/386 |
| 5,036,257 | 7/1991 | Norman et al. .......................... | 315/381 |
| 5,043,639 | 8/1991 | Gurley et al. ............................ | 315/386 |
| 5,057,922 | 10/1991 | Kanai ....................................... | 358/172 |
| 5,111,119 | 5/1992 | Truskalo et al. ......................... | 315/386 |
| 5,359,543 | 10/1994 | Na ............................................ | 348/178 |
| 5,528,296 | 6/1996 | Gove et al. .............................. | 348/275 |
| 5,589,853 | 12/1996 | Fujiki ....................................... | 345/150 |
| 5,608,425 | 3/1997 | Movshovich ............................ | 345/141 |
| 5,680,173 | 10/1997 | White et al. ............................. | 348/380 |
| 5,790,189 | 8/1998 | Moon ....................................... | 348/189 |

*Primary Examiner*—John K. Peng
*Assistant Examiner*—Jean W. Désir
*Attorney, Agent, or Firm*—Joseph S. Tripoli; Joseph J. Laks; Sammy S. Henig

[57] ABSTRACT

A kinescope video driver includes a series connection of a main cascode transistor coupled to a cathode of a cathode ray tube and a video signal amplifying transistor. A second cascode transistor is coupled between the main cascode transistor and the video signal amplifying transistor. The second transistor is coupled to the video signal amplifying transistor through a short wire conductor and to the main cascode transistor through a long wire conductor.

12 Claims, 1 Drawing Sheet

VIDEO SIGNAL DRIVER INCLUDING A CASCODE TRANSISTOR

The present invention relates to kinescope driver circuitry. Specifically, the present invention operates in a projection television receiver, to reduce RF interference generated in high speed digital circuitry, used for generating an auxiliary video signal, from being coupled to the antenna input circuitry due to relatively long wire leads between the auxiliary video signal generator and the kinescope driver circuitry.

An auxiliary video signal generator in current television receivers may include an on-screen display circuit (OSD) for displaying information useful to a viewer, such as channel number and/or time, on the screen. In addition, an auxiliary video signal generator may also be used for displaying patterns useful for adjusting and calibrating the data stored in a digital convergence integrated circuit (DCIC), such as vertical and/or horizontal lines, dots, or color bars.

An OSD generator, for example, may be provided in a receiver to generate a video signal representing the image of the OSD. The OSD image representative signal is generally coupled directly to the final driver of the kinescope, bypassing the channel related television signal processing circuitry. The OSD image representative signal may be applied, alone, or may be time-multiplexed with the video component signal derived from the received television signal and the resulting video signal may be coupled to the cathode electrode of the kinescope.

As is well known, the OSD image representative signal is generated by digital circuitry in an OSD generator. Such an OSD generator is responsive to a high frequency clock signal, and includes digital circuitry switching at that clock frequency. Signals generated by such circuitry can carry substantial harmonic content well into the frequency range to which the tuner circuitry is sensitive. In a standard television receiver, such harmonics are attenuated by placing the tuner and its associated circuitry in a metal shield. Inputs and output terminals of the tuner are isolated by low pass filters where they pass through the shield.

In a projection television receiver, however, the enclosure containing the tuner and the auxiliary video signal generator used for the DCIC is physically separated from the enclosure containing the three kinescopes which generate the images projected on the passive display screen in a known manner. The conductor wire carrying, for example, the image representative auxiliary video signal to the kinescopes, therefore, is relatively long: e.g. several feet long. This wire acts as a transmitting antenna, and the relatively high frequency harmonics of the signal carried by this wire are transmitted back to the antenna input terminal of the tuner. The frequency of the radio frequency RF energy radiated by the harmonics in the image representative signal is in the range to interfere with the primary television signal.

It is possible to minimize RF interference using LC filters. However filters having the characteristics necessary to pass the portion of the image representative signal sufficient to produce a display of reasonable quality, and simultaneously attenuate the RF interference sufficiently, is a relatively complex filter, and requires substantial numbers of components and is expensive to fabricate and assemble. Apparatus for attenuating the RF interference without degrading the image which is relatively inexpensive is desirable.

A typical kinescope driver includes a pair of transistors coupled in a cascode configuration. One of the transistors, referred to as the lower transistor, acts as an amplifier for converting the voltage of the video signal to a current. The other transistor, referred to as the upper transistor, is coupled in a common base configuration to the cathode of the kinescope to isolate the video signal component of the cathode voltage of the kinescope from the collector of the lower transistor.

When applying the auxiliary video signal to the cathode of the tube, it may be desirable to avoid having a long wire conductor between the collector of the corresponding lower transistor and the emitter of the upper transistor in the signal path of the auxiliary video signal. This is so because the signal developed in such a long wire may, undesirably, act with the Miller capacitance, between the base and collector of the lower transistor, to amplify the aforementioned interference producing clock signal related harmonics.

In accordance with an inventive feature, a third transistor is interposed between the lower and upper transistors. The third transistor is coupled in a cascode configuration with respect to the lower transistor. The conductor wire coupling the collector of the lower transistor to the emitter of the third transistor is, advantageously, short. On the other hand, the wire coupling the collector of the third transistor to the emitter of the upper transistor may be long. Thus, the third transistor isolates the amplifying, lower transistor from the long wire. Therefore, advantageously, the signal developed in such long wire can no longer act with the aforementioned Miller capacitance of the lower transistor. Thereby, the RF interference is, advantageously, reduced.

A video driver stage for an electrode of a cathode ray tube embodying an inventive feature includes a source of a first video signal, an amplifying transistor responsive to the first video signal for amplifying the first video signal and a first cascode transistor coupled to the first transistor. A second cascode transistor is coupled to the first cascode transistor such that the first cascode transistor is coupled in a signal path between the amplifying and the second cascode transistor. The second cascode transistor is coupled to the cathode ray tube electrode for applying the first video signal to the cathode ray tube electrode.

In the drawing:

The sole FIGURE is a diagram, partially in block form, partially in schematic form illustrating a kinescope driver incorporating the present invention.

In the FIGURE, a television receiver front end (not shown) produces a video component signal in response to a received television signal, in a known manner. Such a receiver front end includes an antenna and/or cable input terminal, RF amplifiers, IF amplifiers, a tuner, and audio and video signal processing circuitry of known design. The video processing circuitry produces a video signal representing the image included in the television signal, or one video signal representing each color component making up that image.

The illustrated embodiment of the present invention is in a projection television system in which each of the color components (red, green and blue) is coupled to a separate kinescope. In the FIGURE, circuitry supplying a color component image signal to only one of the three kinescopes is illustrated. One skilled in the art will understand that each such kinescope has similar circuitry coupled to it, and will understand what portion of the illustrated circuitry is shared in common amongst all the kinescopes, and what portion of the circuitry is provided separately for each kinescope. One skilled in the art will also understand that the illustrated embodiment may also be used in a standard television receiver in which a single kinescope includes three electron guns, one for each of the color components, or a single electron gun shared by the three colors.

In the FIGURE, a video signal from the receiver front end (not shown) is coupled to a base electrode of a video amplifying transistor T1. An emitter electrode of the video amplifying transistor T1 is coupled to a source of reference potential (ground) through an emitter resistor R1. A biasing circuit (not shown) may be coupled to the base electrode of the video amplifying transistor T1 in a known manner.

An auxiliary video signal generator 10 such as, for example, an on-screen display (OSD) generator produces an image representative signal at an output terminal 10a. Generator 10 may be an auxiliary video signal generator such as, for example, a pattern generator used for calibrating a digital convergence integrated circuit (DCIC). Generator 10 receives a relatively high frequency clock signal (CLK). In the illustrated embodiment, the clock signal has a frequency of 8.56 MHz. Generator 10 includes digital circuitry, not shown in details, which is clocked at the clock signal frequency. The circuitry possibly includes a processor which may be responsive to viewer input, and generates a signal representing the auxiliary image, as described above. The output terminal 10a of generator 10 is coupled to a base electrode of an amplifying transistor T2 through a first biasing resistor R2. A second biasing resistor R3 is coupled between the output terminal of generator 10 and ground. An emitter electrode of amplifying transistor T2 is coupled to ground through an emitter resistor R4. Transistor T2 converts the voltage of the video signal developed at output terminal 10a of generator 10 to a collector current of transistor T2.

In carrying out an inventive feature, a collector electrode of the amplifying transistor T2 is coupled to an emitter electrode of a cascode transistor T3. A source of a biasing potential is coupled to the base electrode of cascode transistor T3. In the illustrated embodiment, the biasing potential is 3 volts. In addition, an RF bypass capacitor C1 is coupled between the base electrode of cascode transistor T3 and ground. The collector electrode of cascode transistor T3 is coupled to a collector electrode of the video amplifying transistor T1 through a collector resistor R5.

The collector of the video amplifying transistor T1 is coupled to an emitter electrode of a main cascode transistor T4 through a series connection of respective resistors R6 and R7. A blanking circuit 20 of known design monitors the vertical and horizontal scanning of the deflection coils (not shown) associated with the kinescopes in the projection television in a known manner. An output terminal of the blanking circuit 20 is coupled to the junction of the resistor R7 and the resistor R6. A source of a main cascode biasing voltage is coupled to a base electrode of the main cascode transistor T4. In the illustrated embodiment, the main cascode biasing voltage is 10 volts. An AC filter capacitor C2 is coupled between the base electrode of the main cascode transistor T4 and ground.

A collector electrode of the main cascode transistor T4 is coupled to a source of an operating potential through a series connection of a peaking coil L1, and a load resistor R8. In the illustrated embodiment, the operating potential is 225 volts. A buffer amplifier 30 has an input terminal coupled to resistor R8. In the illustrated embodiment, the buffer amplifier 30 may be a push-pull (class B) amplifier having series connected complementary transistors, not shown. The output terminal of the buffer amplifier 30 is coupled to a control electrode of a kinescope 40. In the illustrated embodiment, the output terminal of the buffer amplifier 30 is coupled to a cathode electrode of an electron gun in the kinescope 40.

In operation, the video signal from the receiver front end (not shown) is coupled to the kinescope 40 by a cascode amplifier formed from the video amplifying transistor T1 and the main cascode transistor T4, as in prior art arrangements. It may be undesirable to couple the auxiliary video signal from the generator 10 to the kinescope 40 by coupling the collector electrode of amplifying transistor T2 directly to the emitter electrode of the main cascode transistor T4 through a long wire conductor. This is so because the high frequency harmonics in the auxiliary video signal, resulting from the digital circuitry in generator 10, as described above, could have been significantly amplified by the operation of transistor T2. Amplification could occur because of the interaction of the impedance of such long wire with a Miller capacitance CT2, between the collector and base of transistor T2. Had the connection between the collector of amplifying transistor T2 and the main cascode transistor T4 been made directly through a relatively long wire that could be several feet long, and without interposing transistor T3, the high frequency harmonics developed on this long wire could have been amplified and transmitted to the tuner input terminal of the receiver front end, and substantially degraded the operation of the tuner.

In carrying out an inventive feature, the cascode transistor T3, is coupled between the amplifying transistor T2 and the main cascode transistor T4 through a short wire conductor connection, referred to as SHORT WIRE, such as less than one inch. Transistor T3 is arranged to isolate the collector of transistor T2 from the signal developed in the long wire connection between transistors T3 and T4 that could be several feet long. The relatively high frequency harmonics cannot develop because of the low impedance formed at the collector of transistor T2. The low impedance is obtained because of the short wire connection, the low emitter-base impedance and the usage of RF bypass capacitor C1. These harmonics are shunted to ground through the low impedance before being passed to the long wire that is coupled to the main cascode transistor T4. Therefore, the signal developed in the impedance of that long wire cannot interact with Miller capacitance CT2 of transistor T2. Consequently, tuner operation is not adversely affected by any pick up of these harmonics. In addition, the cascode transistor T3 and the RF bypass capacitor C1 do not perceptibly degrade the image. Advantageously, this solution requires only one additional transistor T3 and one RF bypass capacitor C1, which are relatively inexpensive components.

What is claimed is:

1. A video driver stage for an electrode of a cathode ray tube, comprising:

a source of a first video signal;

an amplifying transistor responsive to said first video signal for amplifying said first video signal;

a first cascode transistor coupled to said amplifying transistor;

a second cascode transistor coupled to said first cascode transistor such that said first cascode transistor is coupled in a signal path between said amplifying and said second cascode transistors, said second cascode transistor being coupled to said cathode ray tube electrode for applying said first video signal to said cathode ray tube electrode.

2. A driver stage according to claim 1 wherein said first video signal comprises an auxiliary video signal.

3. A driver stage according to claim 1, wherein said source of video signal comprises one of an on screen display video signal generator and a pattern video generator.

4. A driver stage according to claim 1, further comprising a source of a second video signal and a third transistor responsive to said second video signal and coupled to said second cascode transistor such that said second cascode transistor is coupled to said third transistor in a cascode configuration.

5. A driver stage according to claim 1 wherein said second cascode transistor is coupled to said first cascode transistor via a substantially longer conductor than a conductor coupling said amplifying transistor to said first cascode transistor.

6. A driver stage according to claim 1, further comprising a high frequency bypass capacitor coupled to a control electrode of said first cascode transistor such that a low impedance is developed at a main current conducting terminal of said amplifying transistor at said high frequency.

7. A driver stage according to claim 1, wherein said first video signal is applied to a cathode electrode of said cathode ray tube.

8. A video driver stage for a cathode electrode of a cathode ray tube, comprising:

a first transistor coupled to a cathode electrode of said cathode ray tube;

a second transistor responsive to a first video signal and coupled to said first transistor to form a first cascode video amplifier; and a second cascode video amplifier responsive to a second video signal and coupled to said first transistor via a signal path that bypasses said second transistor.

9. A video driver stage for an electrode of a cathode ray tube, comprising:

a source of a first video signal;

an amplifying transistor responsive to said first video signal for amplifying said first video signal;

a first transistor coupled to said amplifying transistor in a cascode configuration;

a second transistor coupled to said first transistor in a cascode configuration such that said first transistor is coupled in a signal path between said amplifying and said second transistors, said second transistor being coupled to said cathode ray tube electrode for applying said first video signal to said cathode ray tube electrode.

10. A driver stage according to claim 9 wherein said first video signal comprises an auxiliary video signal.

11. A driver stage according to claim 9, wherein said source of video signal comprises one of an on screen display video signal generator and a pattern video generator.

12. A driver stage according to claim 9, further comprising, a source of a second video signal and a third transistor responsive to said second video signal and coupled to said second transistor such that said second transistor is coupled to said third transistor in a cascode configuration.

* * * * *